United States Patent
Schmidt et al.

(10) Patent No.: US 8,862,335 B2
(45) Date of Patent: *Oct. 14, 2014

(54) PROCEDURE AND DEVICE FOR THE CONTROLLING VERTICAL CUT-OFF LINES IN HEADLAMPS WITHIN A SWIVEL RANGE

(75) Inventors: Christian Schmidt, Paderborn (DE); Tobias Irmscher, Gütersloh (DE); Sergej Schwarz, Korntal-Münchingen (DE); Georg Florissen, Erwitte (DE); Christian Hüster, Salzkotten (DE); Carsten Wilks, Lippstadt (DE)

(73) Assignee: Hella KGAA, Lippstadt (DE)

( * ) Notice: Subject to any disclaimer, the term of this patent is extended or adjusted under 35 U.S.C. 154(b) by 189 days.

This patent is subject to a terminal disclaimer.

(21) Appl. No.: 13/063,728

(22) PCT Filed: Sep. 9, 2009

(86) PCT No.: PCT/EP2009/061680
§ 371 (c)(1),
(2), (4) Date: Aug. 18, 2011

(87) PCT Pub. No.: WO2010/029102
PCT Pub. Date: Mar. 18, 2010

(65) Prior Publication Data
US 2011/0295471 A1 Dec. 1, 2011

(30) Foreign Application Priority Data
Sep. 13, 2008 (DE) .......................... 10 2008 047 025

(51) Int. Cl.
*G06F 17/00* (2006.01)
*B60Q 1/12* (2006.01)
*B60Q 1/14* (2006.01)

(52) U.S. Cl.
CPC *B60Q 1/143* (2013.01); *B60Q 1/12* (2013.01); *B60Q 2300/42* (2013.01); *B60Q 2300/056* (2013.01); *B60Q 2300/41* (2013.01)
USPC ............... 701/49; 362/37; 362/460; 362/464; 362/466; 362/507; 362/509; 362/518; 362/538; 362/539; 382/104

(58) Field of Classification Search
CPC ............. G06F 17/00; F21V 1/00; F21V 5/00; F21V 7/00; F21V 13/04; B60Q 1/00; B60Q 1/16; B60Q 1/04; B60Q 1/02; B60Q 1/14; B60Q 1/26; G60K 9/00; G01B 13/18; G02B 5/13; G02B 3/08; H05B 37/02

USPC ........... 362/37, 460, 464, 466, 507, 509, 518, 362/538, 539; 382/104
See application file for complete search history.

(56) References Cited

U.S. PATENT DOCUMENTS 8,157,427 B2 * 4/2012 Mochizuki et al. ........... 362/464
2004/0052083 A1 * 3/2004 Daicho et al. ................. 362/466

(Continued)

FOREIGN PATENT DOCUMENTS

| DE | 2144197 A | 3/1972 |
|---|---|---|
| DE | 102008038536 A1 | 2/2010 |
| EP | 1707438 A1 | 10/2006 |

*Primary Examiner* — James Trammell
*Assistant Examiner* — Sanjeev Malhotra
(74) *Attorney, Agent, or Firm* — Husch Blackwell LLP

(57) ABSTRACT

Device for the control of vertical cut-off lines for headlamps of a motor vehicle within a swivel range, wherein
the control device (10) has a first input (12) for a first signal, which indicates the direction referring to a longitudinal axis (1) of the motor vehicle, in which the motor vehicle ($F_1$) meets the oncoming light source of a motor vehicle ($F_2$) or in which it moves in front of the motor vehicle ($F_1$) in the same direction of travel,
wherein the control device is suitable and equipped for the generation of a control signal for the right-hand headlamp (50) and a control signal for the left-hand headlamp (40) of the motor vehicle ($F_1$) for the adjustment of a vertical cut-off line depending on the first signal,
with which a right-hand vertical cut-off line and a left-hand vertical cut-off line can be adjusted to eliminate the dazzling effect on an oncoming motor vehicle ($F_2$) or a motor vehicle ($F_2$) driving ahead,
wherein the control device (10) is suitable and equipped for the adjustment of the right-hand cut-off line in a given swivel range for the right-hand cut-off line between a right-hand boundary and a left-hand boundary and to the adjustment of the left-hand cut-off line in a given swivel range between a left-hand and a right-hand boundary,
wherein the control device (10) has a second input (13) for a second signal indicating the radius of a bend taken or to be taken by a motor vehicle and
wherein the control device (10) is suitable and equipped for the definition of at least the left-hand boundary of the swivel range of the right-hand cut-off line and the right-hand boundary of the swivel range of the left-hand cut-off line depending on the second signal.

8 Claims, 7 Drawing Sheets

(56) References Cited

U.S. PATENT DOCUMENTS

Figure 1:
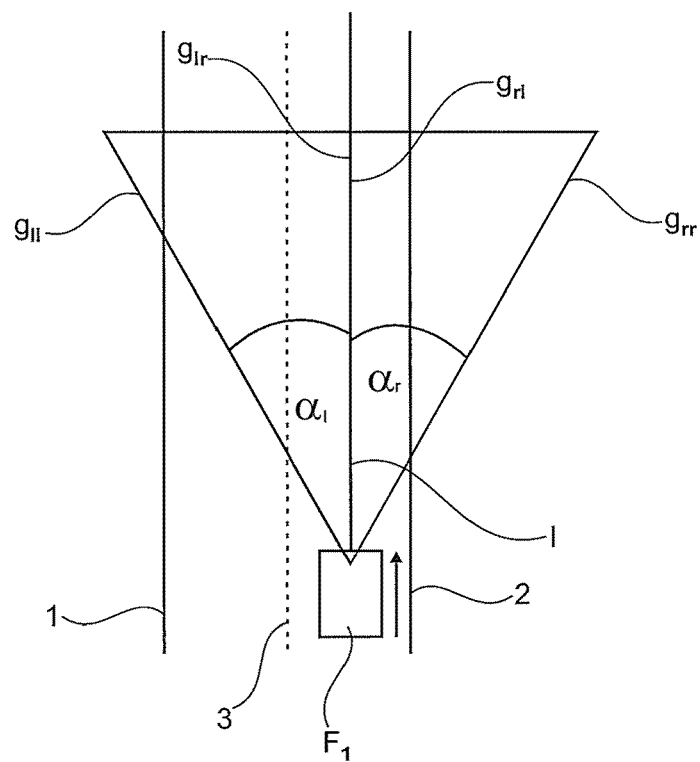
Figure 4:
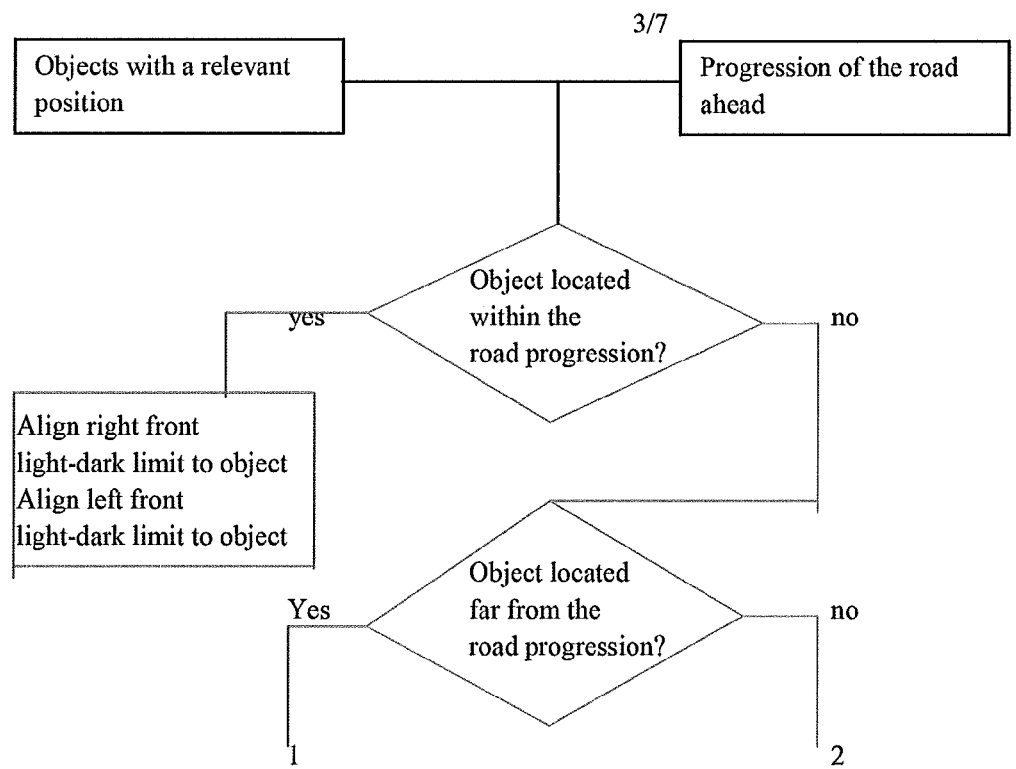
Figure 4A:
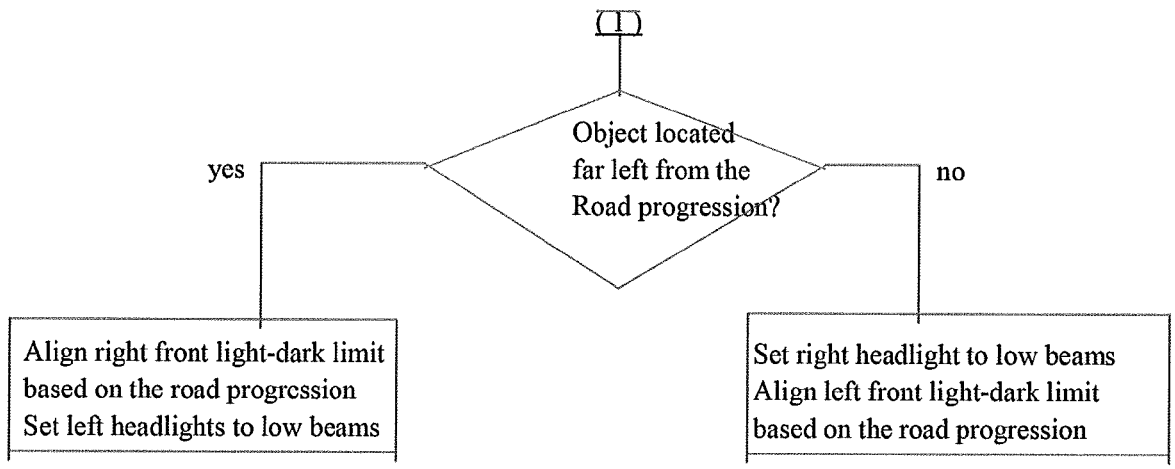
Figure 4B:
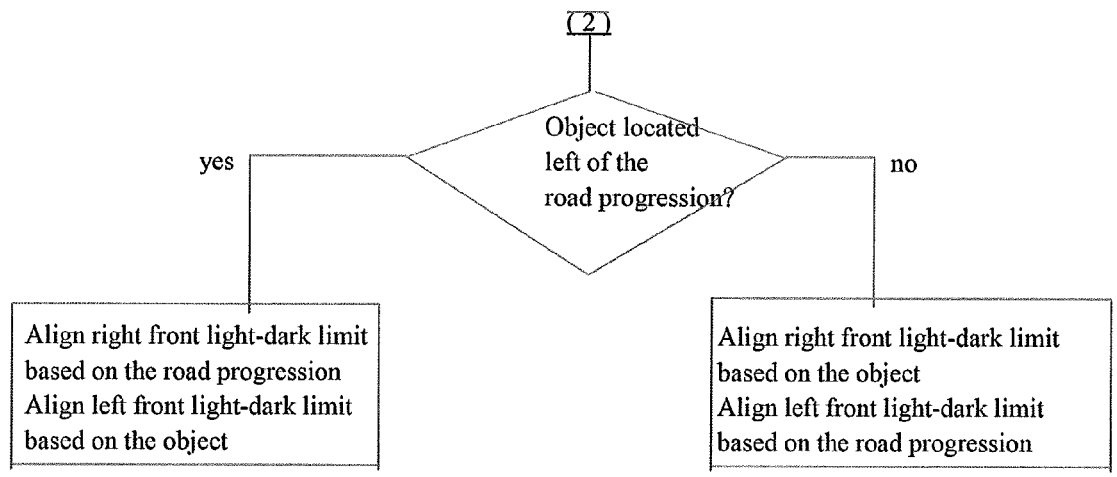
Figure 5:
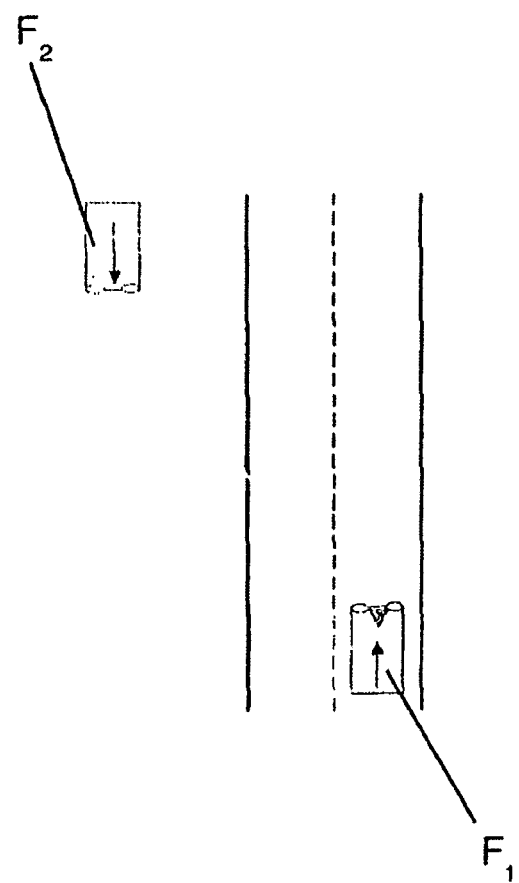
Figure 6:
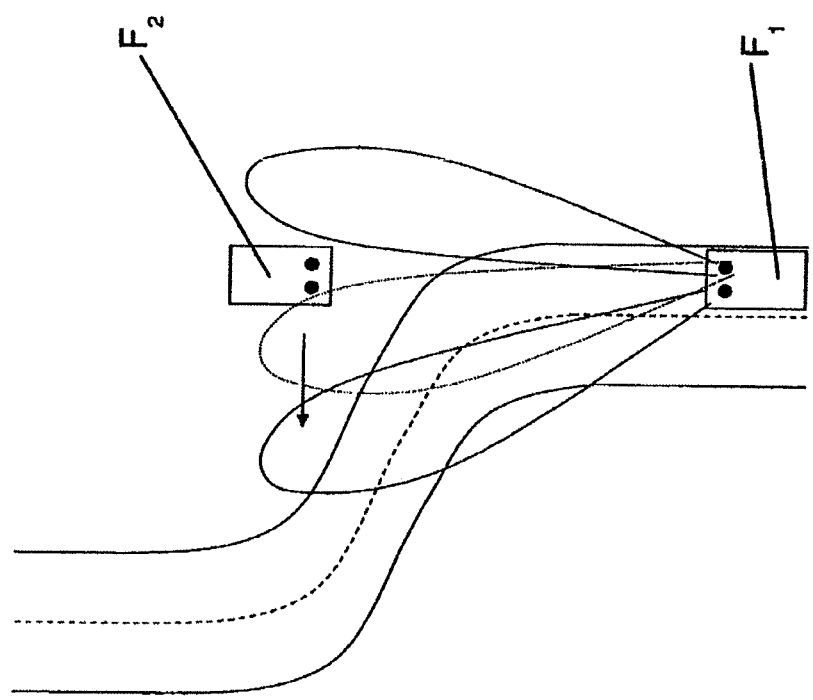

| | | |
|---|---|---|
| 2005/0068786 A1* | 3/2005 | Ishida .......................... 362/509 |
| 2007/0002571 A1* | 1/2007 | Cejnek et al. ................. 362/460 |
| 2007/0236952 A1* | 10/2007 | Chinniah et al. ............. 362/538 |
| 2007/0253597 A1* | 11/2007 | Utida et al. ................... 382/104 |
| 2008/0043486 A1* | 2/2008 | Suzuki .......................... 362/539 |
| 2008/0225539 A1* | 9/2008 | Fujiwara et al. .............. 362/507 |
| 2008/0316761 A1* | 12/2008 | Minano et al. ................ 362/518 |
| 2009/0190323 A1* | 7/2009 | Watanabe et al. .............. 362/37 |
| 2009/0231867 A1* | 9/2009 | Mochizuki et al. ........... 362/466 |
| 2010/0091514 A1* | 4/2010 | Albou et al. .................. 362/538 |

* cited by examiner

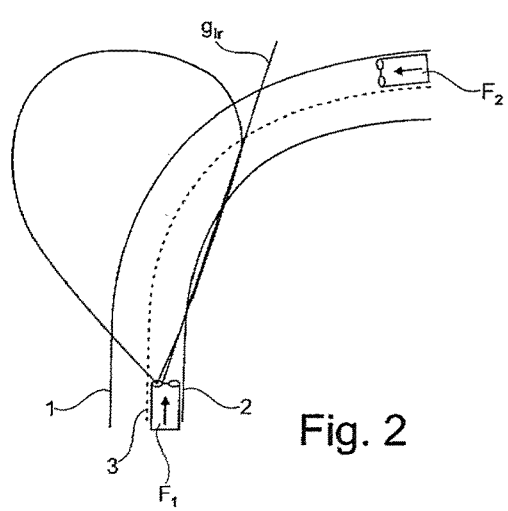
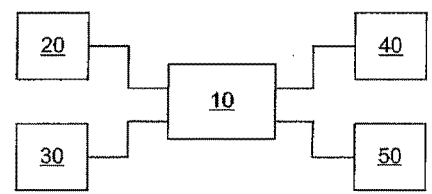
Fig. 2
Fig. 3

PROCEDURE AND DEVICE FOR THE CONTROLLING VERTICAL CUT-OFF LINES IN HEADLAMPS WITHIN A SWIVEL RANGE

This application claims priority to DE102008047025.2 and PCT/EP2009/061680.

Procedure and device for the control of vertical cut-off lines in headlamps within a swivel range of a motor vehicle.

From the published patent application with the publication number DE 21 44 197 a motor vehicle headlamp is known, in which the vertical cutoff lines can be adjusted. The vertical cut-off lines are automatically adjusted by the headlamp to avoid the dazzling of oncoming vehicles or vehicles driving ahead as far as possible. To this end the vertical cut-off lines of the light radiating from the headlamp can be shifted to the right- or the left-hand side. The shifting of the cut-off lines is effected so that the left hand headlamp shines to the left of the object whose driver could possibly be dazzled. Accordingly, the right-hand headlamp is adjusted so that the light beam of this headlamp is directed to the right of the vehicle that must not be dazzled. As a result, an unlighted area called tunnel, in which the vehicle not to be dazzled is situated, develops in front of the motor vehicle. The tunnel is limited by the left-hand and the right-hand cut-off line.

To be able to achieve an automatic adjustment of the vertical cut-off lines of the headlamps, the headlamp has a sensor system. The sensor system recognizes light sources of the oncoming vehicle or the vehicle driving ahead, i.e. either the headlamps or the tail lamps of the vehicle.

Further developments of the headlamps disclosed in the named published patent application DE 21 44 197 are control devices for headlamps, which have a first input for a first signal. This first signal indicates, related to the longitudinal axis of the vehicle, a direction, in which a light source of a second motor vehicle is oncoming or is moving in front of the first motor vehicle in the same direction of travel. The control device can generate a control signal for the right-hand headlamp as well as for the left-hand headlamp. The control signals serve the adjustment of the vertical cut-off line as a function of the first signal. By means of the control device, the right-hand vertical cut-off line of the tunnel is swiveled to prevent the dazzling of an oncoming vehicle or a vehicle driving ahead. Likewise, the left-hand vertical cut-off line of the tunnel is swiveled to prevent the dazzling of an oncoming vehicle or a vehicle driving ahead.

The basis for the determination of the vertical cut-off lines are the object angles read via the first input which are used to determine the oncoming vehicle or the vehicle driving ahead. Attention should be paid to the fact that, as a rule, the object angle does not refer to the contour of the second vehicle as a whole, but merely to the position of the relevant outer light source of the second vehicle recognized by a sensor system. In oncoming vehicles this is the right-hand or left-hand headlamp and in vehicles driving ahead this is the right-hand or the left-hand tail lamp.

The known control devices are usually designed so that the right-hand cut-off line and the left-hand cut-off line can only be adjusted within a given range. These ranges are for example selected so that the right-hand cut-off line cannot lie to the left of the longitudinal direction of the vehicle and the left-hand cut-off line cannot lie to the right of the longitudinal direction of the vehicle. This serves the purpose that outside traffic participants, e.g. work machines in adjacent fields, vehicles on parking lots and such like are not dazzled.

This limitation of the swivel range of the vertical cut-off lines prevents, however, that during cornering the tunnel is made as small as required for not dazzling the oncoming traffic or traffic driving ahead. The tunnel is rather larger than essential, which means that the road is not always lighted during cornering.

It is the object of the invention to improve a control device for the control of the vertical cut-off lines of headlamps so that also during cornering the optimal lighting of the road is ensured and so that the unlighted tunnel is as small as required.

According to the invention this task is solved in that the control device has a second input for a second signal. This second signal indicates the radius of a bend taken or to be taken by a motor vehicle. As a function of the second signal the control device which is suitable and equipped according to the present invention can at least define the left-hand boundary of the swivel range of the right-hand cut-off line and the right-hand boundary of the swivel range of the left hand cut-off line.

Unlike the control devices know from the state of the art, no fixed boundaries for the swivel ranges of the cut-off lines are defined. These can rather be adapted to the radius of the bend taken or to be taken. This allows to set the unlighted tunnel in front of the motor vehicle as narrow as possible and to always achieve the optimal lighting of the road lying ahead of the motor vehicle. This increases the road safety for all road users.

A control device according to the present invention can have a means of calculation for the determination of the left-hand boundary of the swivel range of the right-hand cut-off line and of the right-hand boundary of the swivel range of the left-hand cut-off line as a function of the second signal, that means as a function of the radius of the bend. The means of calculation can as well be suitable to calculate the right-hand and left hand cut-off lines to be adjusted.

During straight-ahead driving of a motor vehicle with the control device according to the present invention, the left-hand boundary of the swivel range of the right-hand cut-off line and the right-hand boundary of the swivel range of the left-hand cut-off line will be on the longitudinal axis of the motor vehicle, i.e at 0°.

During cornering of the motor vehicle, however, the left-hand boundary of the swivel range of the right-hand cut-off line and the right-hand boundary of the swivel range of the left-hand cut-off line can be shifted depending on the size of the radius of the curve taken or to be taken. The left-hand boundary of the swivel range of the right-hand cut-off line is preferably shifted to the left in a left-hand bend and, with the longitudinal axis of the motor vehicle, includes an angle which is smaller than 0°. The right-hand boundary of the swivel range of the left-hand cut-off line is preferably shifted to the right in a right-hand bend and, with the longitudinal axis of the motor vehicle, foams a second angle which is larger than 0°.

According to the present invention the means of calculation can be suitable and equipped to calculate the boundaries of the swivel ranges according to given equations.

A control device according to the present invention can be suitable and equipped for the determination of a swivel range for adaptive bend lighting. Thus the headlamps of the motor vehicle can be swiveled in the direction of the bend when a bend is taken or before a bend is taken. Such a control device can be designed so that the angle for the boundary of the right-hand or left-hand cut-off line is set as the swivel angle for the adaptive bend-lighting. The swiveling of the light distribution can also advantageously be executed without moving parts by means of pixel headlamps or headlamps with LED arrays.

The invention is explained in detail by means of the enclosed drawings. Herein,

FIG. 1 shows the swivel ranges of the right-hand and the left-hand cut-off line during straight ahead driving, FIG. 2 shows the left-hand cut-off line swiveled to the right while taking a right-hand bend and FIG. 3 shows a block diagram of an arrangement with a control device according to the present invention.

FIG. 1 shows a motor vehicle $F_1$ during straight forward driving on a road, which is marked by a left-hand roadside borderline 1, a right-hand roadside borderline 2 and a center line 3. The motor vehicle $F_1$ has headlamps, whose vertical cut-off lines are adjustable to avoid the dazzling of the oncoming traffic or traffic driving ahead. To avoid the dazzling of the oncoming traffic or the traffic driving ahead, the headlamps are swiveled so that the oncoming traffic or the traffic driving ahead is situated in an unlighted area of the road. This unlighted area of the road, also called tunnel, is limited on the left-hand side by the left-hand cut-off line and on the right-hand side by the right-hand cut-off line.

The control device for the adjustment of the cut-off line according to the present invention specifies swivel ranges within which the left-hand vertical cut-off line and the right-hand vertical cut-off line can be adjusted without endangering other road users. This means that the right-hand vertical cut-off line can be swiveled between the boundary $g_{rr}$ and the boundary $g_{rl}$. The swivel range of the right-hand cut-off line is limited by these two boundaries $g_{rr}$, $g_{rl}$. The swivel range of the left-hand vertical cut-off line is limited analogously. The left-hand boundary for the swivel range of the left-hand vertical cut-off line is marked $g_{ll}$ and the left-hand boundary of the swivel range is marked $g_{lr}$.

The right-hand boundary $g_{lr}$ of the swivel range for the left-hand vertical cut-off line and the left-hand boundary $g_{rl}$ of the swivel range for the right-hand vertical cut-off line coincide and both lie on the longitudinal axis 1 of the motor vehicle $F_1$.

When the motor vehicle $F_1$ with the control device according to the present invention drives through a right-hand corner, as shown in FIG. 2, the right-hand boundary $g_{lr}$ of the swivel range of the left-hand vertical cut-off line is shifted to the right, however. The right-hand boundary $g_{lr}$ now forms an angle larger than 0° with the longitudinal axis of the motor vehicle. By this means, the road lying ahead of the motor vehicle $F_1$ is lighted better and the tunnel is limited to the necessary minimum A control device 10 according to the present invention is preferably arranged so that it can send control signals to a right-hand headlamp 50 and to a left-hand headlamp 40. Furthermore it is connected to a device with which the object angle can be determined. This device 20 supplies the control device 10 with a signal on the object angle of the vehicle $F_2$ driving ahead of the vehicle $F_1$ or the oncoming vehicle $F_2$. Furthermore, the control device 10 according to the present invention is connected with a means determining the radius of the bend taken or to be taken. Herein, the radius of the bend can be determined by various means. It is for example conceivable, that the radius of the bend is determined by the turning angle of the steering wheel, the yaw rate, the angle of steering lock of the front wheels, by data from a satellite navigation system or by camera data.

The invention claimed is:

1. A control device for controlling of vertical cut-off lines in headlamps for motor vehicles within a swivel range, comprising:

the control device has a first input for a first signal, said first signal indicating a direction relative to a longitudinal axis of the motor vehicle, when the motor vehicle meets a light source of another motor vehicle;

wherein the control device generates a control signal for a right-hand headlamp and a control signal for a left-hand headlamp of the motor vehicle for an adjustment of a vertical cut-off line depending on the first signal;

a right-hand vertical cut-off line and a left-hand vertical cut-off line can be adjustable thereby to eliminate the dazzling effect on an oncoming motor vehicle or a motor vehicle driving ahead; and whereby the control device signals initiate an independent movement of each of said right-hand headlamp and left-hand headlamp via:

an adjustment of the right-hand cut-off line in a given swivel range for the right-hand cut-off line between a right-hand boundary to a left-hand boundary, an adjustment of the left-hand cut-off line in a given swivel range between a left-hand boundary to a right-hand boundary, the control device having a second input for a second signal, said second signal indicating the radius of a bend being taken or to be taken by the motor vehicle, and the control device adjusts one of the left-hand boundary of the swivel range of the right-hand cut-off line and the right-hand boundary of the swivel range of the left-hand cut-off line depending on the second signal.

2. The control device following claim 1, characterized in that the control device calculates a determination of the left-hand boundary of the swivel range of the right-hand cut-off line and of the right-hand boundary of the swivel range of the left-hand cut-off line depending on the second signal.

3. The control device following claim 2, wherein the control device:

independently shifts the left-hand boundary of the swivel range of the right-hand cut-off line to the left in a left-hand bend and forms a first angle smaller than 0° with the longitudinal axis of the motor vehicle, and independently shifts the right-hand boundary of the swivel range of the left-hand cut-off line to the right in a right-hand bend and forms a second angle larger than 0° with the longitudinal axis of the motor vehicle.

4. The control device following claim 3, wherein said control device independently shifts:

the right-hand boundary of the swivel range of the right-hand cut-off line to the left in a left-hand bend by the first angle, and the left-hand boundary of the swivel range of the left-hand cut-off line to the right in a right-hand bend by the second angle.

5. The control device following claim 3, characterized in that the control device independently adjusts the first or the second angle for the boundaries of the right hand or left hand cut-off lines as a swivel angle for adaptive bend lighting.

6. The control device following claim 1, characterized in that during straight-ahead driving the left-hand boundary of the swivel range of the right-hand cut-off line and the right-hand boundary of the swivel range of the left-hand cut-off line are substantially at 0°, i.e. substantially on the longitudinal axis of the motor vehicle.

7. The control device following claim 1, characterized in that the control unit for the determination of a swivel angle for adaptive bend lighting independently swivels the headlamps in the direction of a bend when a bend is taken or before the bend is taken.

8. A method for a control of vertical cut-off lines in headlamps of a motor vehicle within a swivel range, comprising:

receiving a first signal by a control device indicating a direction relative to a longitudinal axis of the motor vehicle, when the motor vehicle meets a light source of another motor vehicle;

generating a control signal for a right-hand headlamp and a control signal for a left-hand headlamp of the motor vehicle for an adjustment of the vertical cut-off lines:

independently adjusting a right-hand cut-off line in a defined swivel range for the right-hand cut-off line between a right-hand boundary to a left-hand boundary, independently adjusting a left-hand cut-off line in the defined swivel range between a left-hand boundary to a right-hand boundary, and receiving a second input by the control device indicating the radius of a bend being taken or to be taken by the motor vehicle; and defining at least one of the left-hand boundary of the swivel range of the right hand cut-off line and the right-hand boundary of the swivel range of the left hand cut-off line as a function of the second signal.

\* \* \* \* \*